United States Patent
Bishop, III et al.

(10) Patent No.: US 11,765,165 B2
(45) Date of Patent: Sep. 19, 2023

(54) WEB-BROWSER EXTENSION ANALYSIS AND ENHANCEMENT

(71) Applicant: BANK OF AMERICA CORPORATION, Charlotte, NC (US)

(72) Inventors: Jack Lawson Bishop, III, Evanston, IL (US); Timothy Andrew Wright, Bracknell (GB)

(73) Assignee: BANK OF AMERICA CORPORATION, Charlotte, NC (US)

(*) Notice: Subject to any disclaimer, the term of this patent is extended or adjusted under 35 U.S.C. 154(b) by 424 days.

(21) Appl. No.: 17/028,419

(22) Filed: Sep. 22, 2020

(65) Prior Publication Data

US 2022/0094683 A1    Mar. 24, 2022

(51) Int. Cl.
*H04L 29/06* (2006.01)
*G06F 16/958* (2019.01)
*H04L 9/40* (2022.01)

(52) U.S. Cl.
CPC ........ *H04L 63/0876* (2013.01); *G06F 16/958* (2019.01); *H04L 63/0485* (2013.01); *H04L 63/10* (2013.01); *H04L 63/20* (2013.01)

(58) Field of Classification Search
CPC . H04L 63/0876; H04L 63/0485; H04L 63/10; H04L 63/20; H04L 63/1433; H04L 63/1425; G06F 16/958; G06F 9/44526; G06F 21/52; G06F 21/552

USPC ......................................................... 713/151
See application file for complete search history.

(56) References Cited

U.S. PATENT DOCUMENTS

| | | | |
|---|---|---|---|
| 8,181,254 B1 | 5/2012 | Kay et al. | |
| 8,566,901 B2 | 10/2013 | Kay et al. | |
| 8,935,755 B1 | 1/2015 | Kay | |
| 9,098,710 B2 | 8/2015 | Kay et al. | |
| 9,384,101 B2 * | 7/2016 | Calvo | G06F 9/461 |
| 10,282,412 B2 | 5/2019 | Trivedi et al. | |
| 10,536,363 B2 | 1/2020 | Sommer et al. | |
| 2008/0184102 A1 * | 7/2008 | Selig | G06F 40/174 715/234 |
| 2020/0174908 A1 | 6/2020 | Chen | |

* cited by examiner

*Primary Examiner* — Tu T Nguyen
(74) *Attorney, Agent, or Firm* — Moore & Van Allen PLLC; James C. Edwards

(57) ABSTRACT

Enhancement of web browser extension analysis capabilities, such as security application analysis, is realized by encapsulating the extension with a wrapper function that defines entry and exits points within the source code of the extension. By wrapping the web browser extension in a function that defines entry and exit points, the present invention enables the use of commercial SAST tools/engines and any other application which desires to analyze the web browser extension and/or extract data therefrom. The web browser extension is programmatically analyzed to identify the entry and exit points and, in response, the wrapper function is generated that defines the entry and exits points and the web browser extension is encapsulated with the wrapper function.

16 Claims, 5 Drawing Sheets

WEB-BROWSER EXTENSION ANALYSIS AND ENHANCEMENT

FIELD OF THE INVENTION

The present invention relates to web browser extensions and more specifically enhancing web browser extensions application security analysis by encapsulating the web browser extension with a wrapper function that facilitates application security analysis of the web browser extension, such as, is required by Static Application Security Testing (SAST) engines or the like.

BACKGROUND

Web browsers are software applications used for accessing information on the World Wide Web/Internet. Web browser extensions are specialized software modules for customizing a web browser at the discretion of the user. Web browsers typically are configured to allow for a variety of different types of web browser extensions, such as, but not limited to, password management user interface modifications, advertisement blocking, cookie management and the like. The source code of each web browser extension is configured to be executed on a specific web browser. Web browser extensions are updated by their respective developers frequently and, as a result, require continual and efficient automated security analysis to identify that the updates do not pose security threats.

Static Application Security Testing (SAST), also referred to as static analysis security testing or static analysis, is a commonly known testing methodology that analyzes source code to find defects or potential defects (i.e., vulnerabilities) that make the application susceptible to malicious use. The nature of SAST means that the source code is scanned prior to execution (as opposed to dynamic testing which scans the code during execution).

Web browser extensions are exclusively written in code that conforms to the ECMAScript (European Computer Manufacturer's Association script) specification, such as JAVASCRIPT, available from Oracle Corporation of Redwood City, California. While commercial off-the-shelf manufacturers of SAST products state their SAST products support JAVASCRIPT, such products are incapable of being used with web browser extensions because of the means by which web browser extensions are packaged and how the code is written. Specifically, web browser extensions do not have defined entry and exits points that existing SAST products rely on for scanning operations.

As a result of the inability to apply commercial SAST solutions to web browser extensions, heretofore, web browser extension security analysis has been performed in a non-automated, manual fashion, which is inefficient and inconsistent.

Therefore, a need exists to develop systems, methods, computer program products and the like that enhance web browser extensions so as to them compatible with commercial off-the-shelf SAST products or any other software application which desires to extract data from a web browser extension. The desired systems, methods, computer program products and the like should provide increased efficiency and consistency of web browser extension security analysis or any other process that desires to extract/analyze data from the web browser extension.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by enhancing the capabilities of web browser extensions by encapsulating the web browser extensions in a wrapper function that defines the entry points and exit points of the web browser extension. As a result, by providing the web browser extension with such a wrapper function, the web browser extension is capable of being analyzed (i.e., scanned) or having data extracted by applications (e.g., tools, engines or the like) requiring such. Specifically, the encapsulated web browser extension provides for commercial off-the shelf SAST products to be applied to the web browser extension as a means for providing automated security testing of the extension's source code.

In accordance with embodiments of the present invention, the web browser extension is programmatically analyzed to identify the entry points and exits points and a wrapper function is generated that defines the identified entry and exits points. Entry and exit points may be identified based on instances in the source code where control starts and control stops and/or instances in which data enters and exits the web browser extension.

Subsequently, once the wrapper function has been generated, the web browser extension is encapsulated with the wrapper function. The encapsulated web browser extension does not alter the logic of the underlying web browser extension and the packaging of the web browser extension itself remains consistent and documented. The wrapper function provides the ability for an application to analyze/scan the web browser extension or otherwise extract data from the web browser extension.

A system for enhancing capabilities of a web browser extension, specifically application security analysis, defines first embodiments of the invention. The system includes a web browser extension configured to provide one or more features to a web browser application. The system additionally includes a first computing platform having a first memory, one or first processing devices in communication with the first memory and first instructions stored in the first memory and executable by the at least one of the first processing devices. The first instructions are configured to analyze the web browser extension to identify one or more entry points and one or more exits points in the web browser extension, generate a wrapper function for the web browser extension that defines the one or more identified entry points and the one or more identified exits points, and encapsulate the web browser extension with the wrapper function.

In specific embodiments the system further includes a second computing platform having a second memory, one or more second processing devices in communication with the second memory and second instructions stored in the second memory and executable by at least one of the second processing devices. The second instructions are configured to be applied to the encapsulated web browser to retrieve or analyze data from the encapsulated web browser extension based on the one or more entry points and the one or more the exits points defined by the wrapper function. In specific embodiments of the invention, the second instructions are further defined as a Static Application Security Testing (SAST) engine that is configured to scan the encapsulated web browser extension, based on the one or more entry points and the one or more the exits points defined by the wrapper function, to identify at least one of one or more security defects and one or more potential security defects in the web browser extension.

In further specific embodiments of the system, the one or more entry points are defined by first instances in which control of a function starts in the web browser extension and the one or more exit points are defined by second instances in which the control of the function stops in the web browser extension.

In other specific embodiments of the system, the one or more entry points are defined by first instances in which data is received by the web browser extension and the one or more exits points are defined by second instances in which data exits the web browser extension.

In still further specific embodiments of the system, the one or more exits points are identified by one or more Application Programming Interfaces (APIs) documented with the web browser extension.

A computer-implemented method for enhancing analysis capabilities of a web browser extension. The method is executed by one or more processing devices and includes (i) analyzing a web browser extension to identify one or more entry points and one or more exits points in the web browser extension, (ii) generating a wrapper function for the web browser extension that defines the one or more identified entry points and the one or more identified exits points, and (iii) encapsulating the web browser extension with the wrapper function.

In further embodiments the method includes retrieving, by a software application, data from the encapsulated web browser extension based on the one or more entry points and the one or more the exits points defined by the wrapper function. In such embodiments of the method, the software application may be further defined a Static Application Security Testing (SAST) engine. In such embodiments the method may further include scanning, by the SAST engine, the encapsulated web browser extension, based on the one or more entry points and the one or more the exits points defined by the wrapper function, to identify at least one of one or more security defects and one or more potential security defects in the web browser extension.

In further specific embodiments of the method, analyzing further includes analyzing the web browser extension to identify first instances in which control of a function starts in the web browser extension and second instances in which the control of the function stops in the web browser extension. In other embodiments of the method, analyzing further includes analyzing the web browser extension to identify first instances in which data is received by the web browser extension and second instances in which data exits the web browser extension. Moreover, in additional specific embodiments of the method, analyzing further includes analyzing the web browser extension to identify one or more Application Programming Interfaces (APIs) documented with the web browser extension as the one or more exit points.

A computer program product including non-transitory computer-readable medium defines third embodiments of the invention. The computer-readable medium includes a first set of codes for causing a computer to analyze a web browser extension to identify one or more entry points and one or more exits points in the web browser extension. Additionally, the computer-readable medium includes a second set of codes for causing a computer to generate a wrapper function for the web browser extension that defines the one or more identified entry points and the one or more identified exits points. Moreover, the computer-readable medium includes a third set of codes for causing a computer to encapsulate the web browser extension with the wrapper function.

In specific embodiments the computer program product further includes a fourth set of codes for causing a computer to retrieve or analyze, by a software application, data from the encapsulated web browser extension based on the one or more entry points and the one or more the exits points defined by the wrapper function. In specific embodiments of the computer program product, the software application is further defined as a Static Application Security Testing (SAST) engine. In such embodiments of the computer program product, the fourth set of codes are further configured to cause the computer to scan the encapsulated web browser extension, based on the one or more entry points and the one or more the exits points defined by the wrapper function, to identify at least one of one or more security defects and one or more potential security defects in the web browser extension.

In further specific embodiments of the computer program product, the first set of codes are further configured to cause the computer to analyze the web browser extension to identify first instances in which control of a function starts in the web browser extension and second instances in which the control of the function stops in the web browser extension.

In other specific embodiments of the computer program product, the first set of codes are further configured to cause the computer to analyze the web browser extension to identify first instances in which data is received by the web browser extension and second instances in which data exits the web browser extension.

Thus, systems, apparatus, methods, and computer program products herein described in detail below provide analysis capabilities of a web browser extension by encapsulating the extension with a wrapper function that defines entry and exits points within the source code of the extension. By wrapping the web browser extension in a function that defines entry and exit points, the present invention enables the use of commercial SAST tools/engines and any other application which desires to analyze the web browser extension and/or extract data therefrom.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
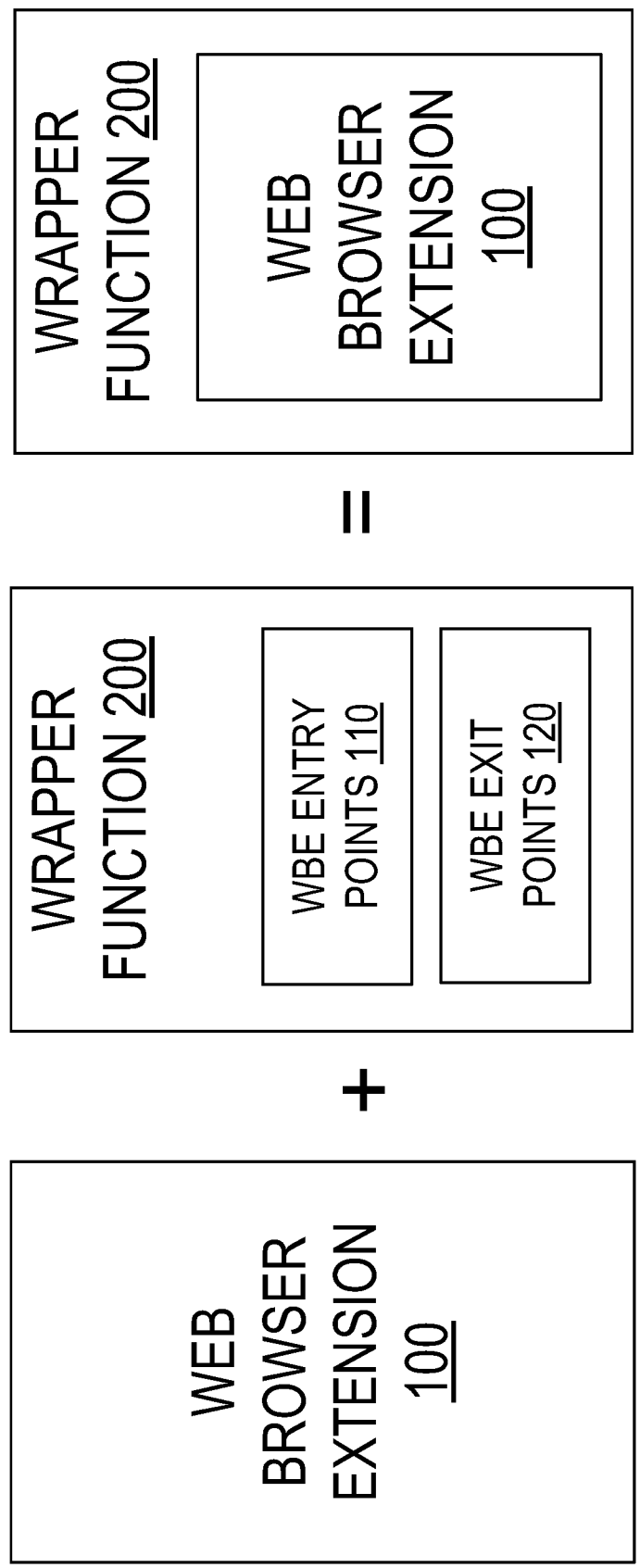
Figure 2:
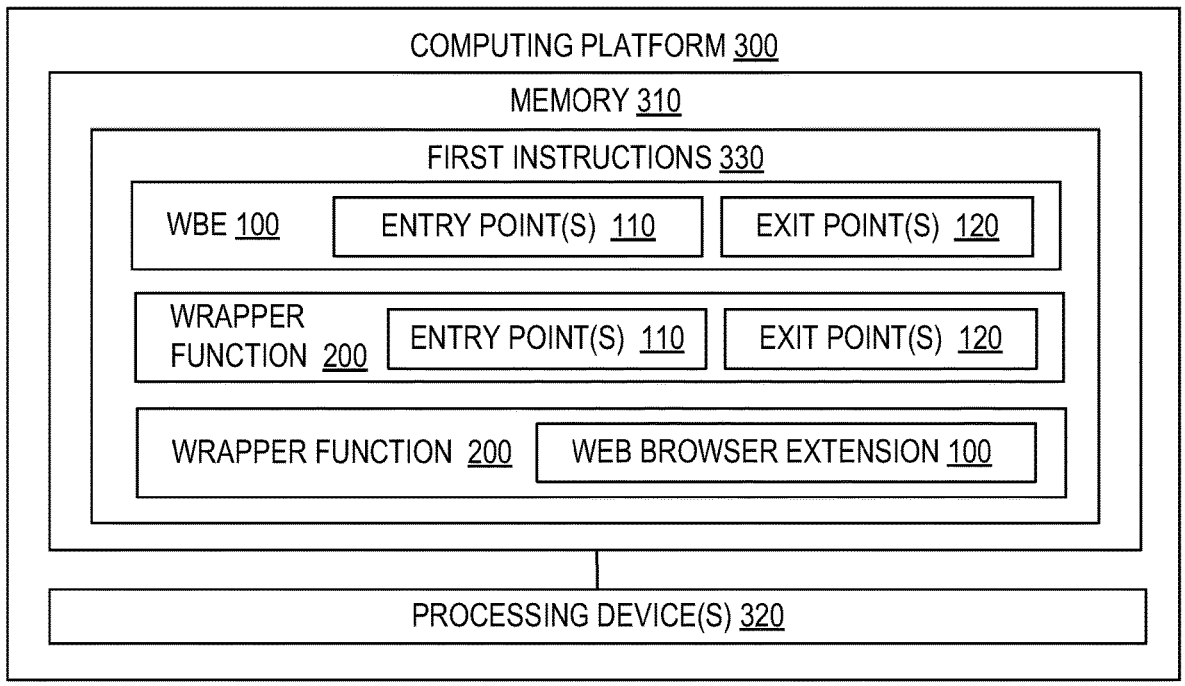
Figure 3:
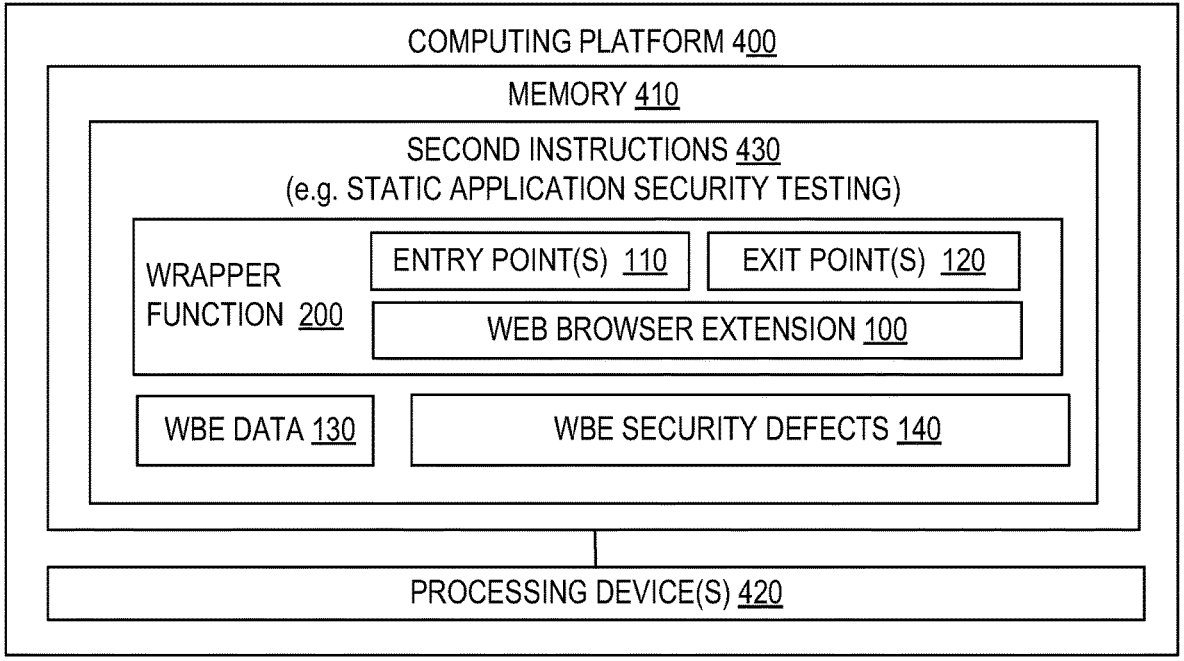
Figure 4:
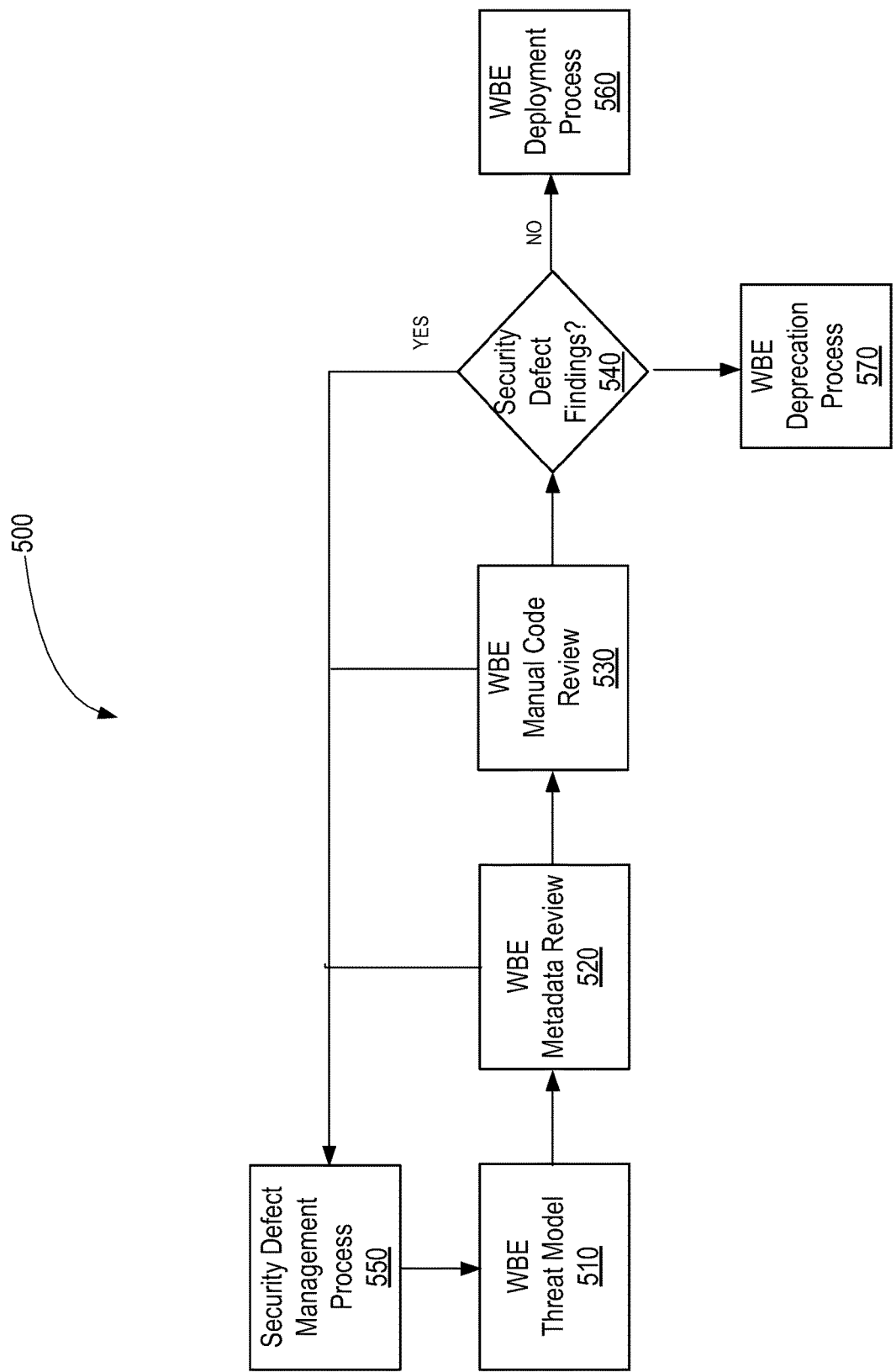
Figure 5:
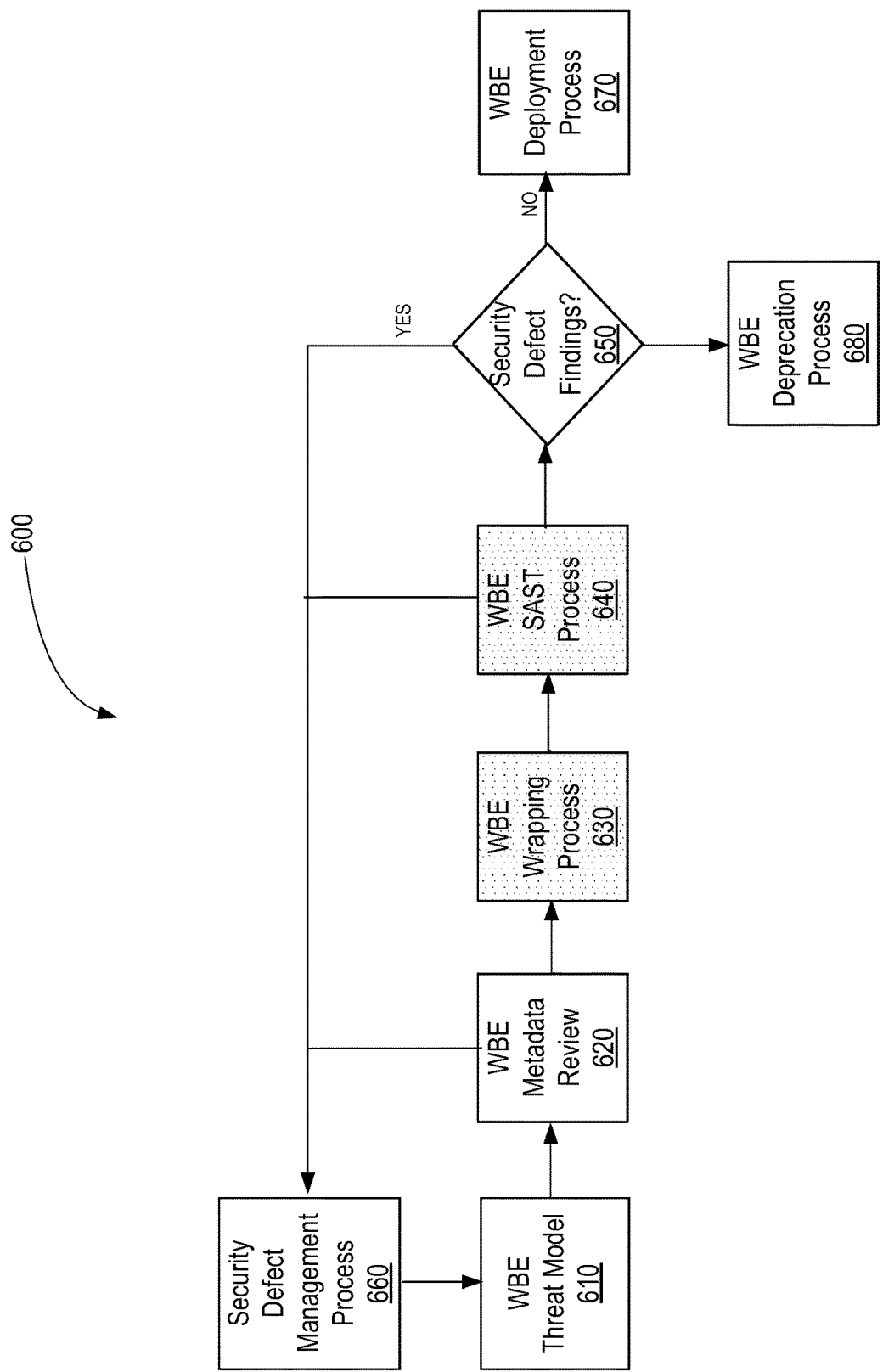
Figure 6:
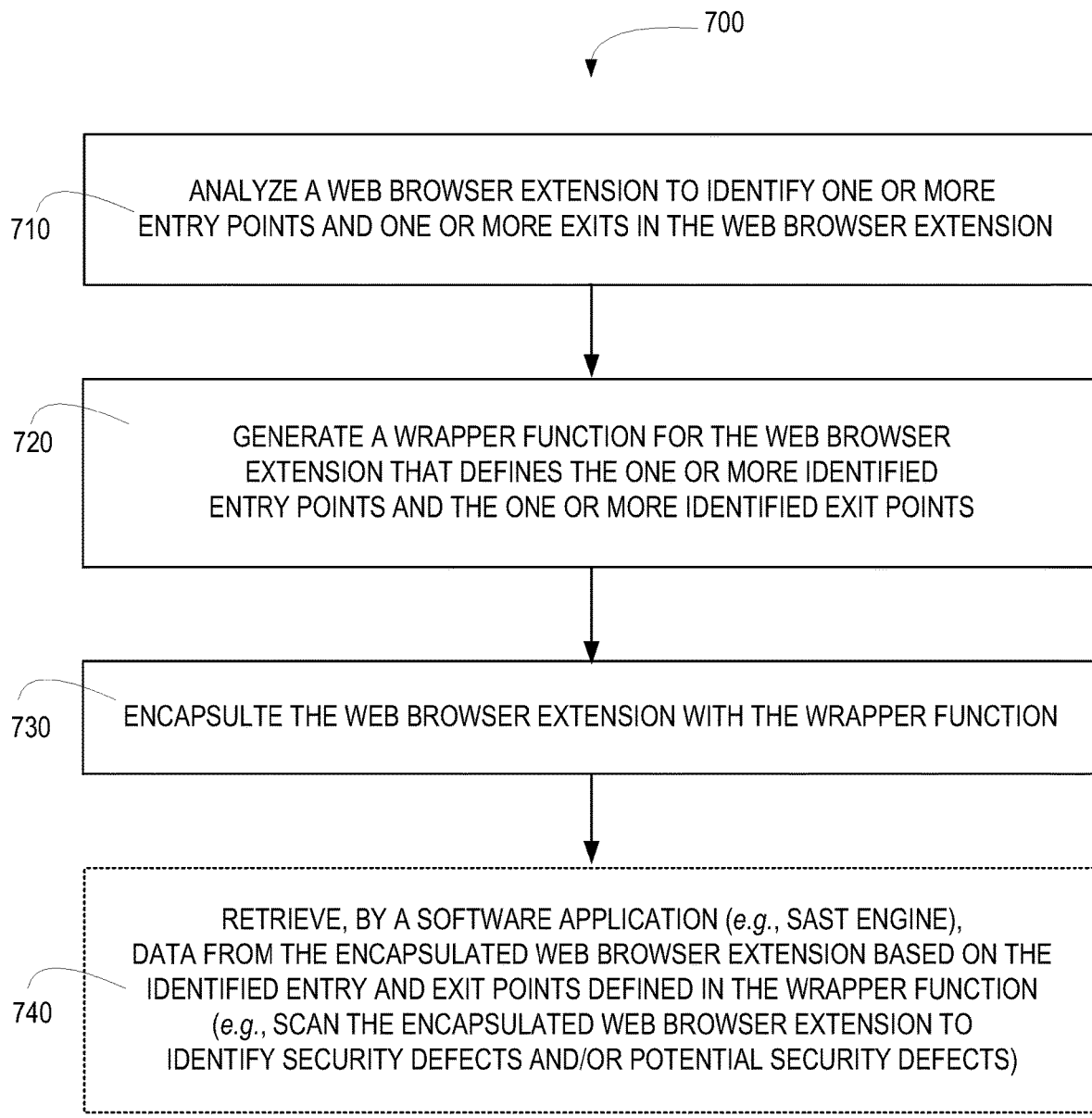

Having thus described embodiments of the invention in general terms, reference will now be made the accompanying drawings, wherein:

FIG. 1 is a block diagram of a web browser extension encapsulated with a wrapper function that defines entry and exit points, in accordance with embodiments of the present invention;

FIG. 2 is a block diagram of computing apparatus configured for analyzing a web browser extension for identifying entry and exit points, generating a wrapper function that defines the identified entry and exit points and encapsulating the web browser extension with the wrapper function, in accordance with embodiments of the present invention;

FIG. 3 is a block diagram of computing apparatus configured for extracting data from the encapsulated web browser extension based on the identified entry and exit points, in accordance with embodiments of the present invention; and FIG. 4 is a flow diagram of method for fully manual security analysis of a web browser extension, in accordance with the prior art;

FIG. 5 is a flow diagram of method for security analysis of a web browser extension using a Static Application Security Testing engine, in accordance with embodiments of the present invention; and FIG. 6 is a flow diagram of method for enhancing the analysis capabilities of a web browser extension, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as PYTHON, JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" or "configured for" perform (or "configured for" performing) a certain function in a variety of ways, including, for example, by having one or more general-purpose circuits perform the function by executing particular computer-executable program code embodied in computer-readable medium, and/or by having one or more application-specific circuits perform the function.

Thus, as described in more detail below, embodiments of the present invention provide for enhancing the analysis capabilities of web browser extensions by encapsulating the web browser extensions in wrapper functions that defines the entry points and exit points of the web browser extension. As previously discussed, unlike we browsers, web browser extensions are typically packaged in such a manner that they are not conducive to having data extracted and, more specifically, not conducive to being scanned by Static Application Security Testing (SAST) engines/tools for purposes of identifying security defects or potential security defects in the web browser extension. By encapsulating the web browser extension in a wrapper function that defines the entry and exits points, the web browser extension is capable of being analyzed (i.e., scanned) or having data extracted by applications requiring such. Specifically, the encapsulated web browser extension provides for commercial off-the shelf SAST products to be applied to the web browser extension as a means for providing automated security testing of the extension's source code.

According to specific embodiments of the invention detailed below, the web browser extension is programmatically analyzed to identify the entry points and exits points and a wrapper function is generated that defines the identified entry and exits points. Entry and exit points may be identified based on instances in the source code where control starts and control stops and/or instances in which data enters and exits the web browser extension. Subsequently, once the wrapper function has been generated, the web browser extension is encapsulated with the wrapper function. By automatically analyzing the web browser extension for entry and exit points, generating the wrapper function and encapsulating the web browser extension with the wrapper function, the present invention adds efficiency and consistency to processes/applications requiring data and/or scanning of the web browser extension.

Turning now to the figures, FIG. 1 illustrates a block diagram of a web browser extension 100 encapsulated with a wrapper function 200 that defines the entry points 110 and exits points system 120 within the web browser extension, in accordance with embodiments of the invention. Web browser extensions 100 are almost exclusively written in a programming language that complies with ECMAScript (European Computer Manufacturer's Association Script) specification, such as JAVASCRIPT, available from Oracle Corporation of Redwood City, California. However, web browser extensions 100 are packaged in such a way that they are not susceptible to data extraction or scanning, since the web browser extensions 100 do not have defined entry points or exits points (i.e., instances in the application at which control is provided to the web browser extension and at which control is stopped). By providing a wrapper function 200 that defines/emulates the entry points 110 and exit points 120 within the web browser extension 100, the present invention enables the web browser extension to be processed by any application, operating system, tool, engine or the like that requires data from and/or scanning of the web browser extension.

Referring to FIG. 2, a block diagram is presented of a computing platform 300 configured for enhancing the analysis capabilities of a web browser extension, in accordance with embodiments of the present invention. The computing platform 300 may comprise one or more computing devices (e.g., server(s) or the like) and is configured to execute software programs, including instructions, algorithms, modules, routines, applications, tools and the like. Computing platform 300 includes memory 310 and the like which may comprise volatile and non-volatile memory, such as read-only and/or random-access memory (RAM and ROM), EPROM, EEPROM, flash cards, or any memory common to computing platforms). Moreover, memory 310 and the like may comprise cloud storage, such as provided by a cloud storage service and/or a cloud connection service.

Further, computing platform 300 also includes at least one processing device 320, which may be an application-specific integrated circuit ("ASIC"), or other chipset, logic circuit, or other data processing device configured to execute first instructions 330. Processing device(s) 320 or the like may execute one or more application programming interface (APIs) (not shown in FIG. 2) that interface with any resident programs, such as first instructions 330 or the like stored in the memory 310 of the computing platform 300 and any external programs. Processing device(s) 320 may include various processing subsystems (not shown in FIG. 2) embodied in hardware, firmware, software, and combinations thereof, that enable the functionality of computing platform 300 and the operability of computing platform 300 on a distributed communications network (not shown in FIG. 2). For example, processing subsystems allow for initiating and maintaining communications and exchanging data with other networked devices, such as computing platform 400 (shown in FIG. 3). For the disclosed aspects, processing subsystems of computing platform 300 may include any processing subsystem used in conjunction with first instructions 330 and related engines, tools, routines, sub-routines, algorithms, sub-algorithms, sub-modules thereof.

Computing platform 300 may additionally include a communications module (not shown in FIG. 2) embodied in hardware, firmware, software, and combinations thereof, that enables electronic communications between computing platform 300 and other network devices, such as, but not limited to, computing platform 400 (shown in FIG. 3). Thus, communication module may include the requisite hardware, firmware, software and/or combinations thereof for establishing and maintaining a network communication connection with one or more network devices.

Memory 310 stores first instructions 330 that are configured to analyze the web browser extension 100 to programmatically identify entry point(s) 110 and exit point(s) 120. In specific embodiments of the invention the entry points 110 are identified by commands in the web browser extension 100 that indicate the start of control or where data enters the web browser extension. In other specific embodiments of the invention the exit points 120 are identified by commands in the web browser extension that indicate the stop of control or where data exits the web browser extension. Moreover, exit points 120 may be defined by Application Programming Interfaces (APIs) documented/references in the web browser extension. In response to identifying the entry and exit points, first instructions 330 are configured to programmatically generate the wrapper function 200 that defines the identifies the entry point(s) 110 and exit point (120) and encapsulate the web browser extension 100 with the generated wrapper function 200.

Referring to FIG. 3, a block diagram is presented of a computing platform 400 configured for applying data extraction and/or scanning instructions to the encapsulated web browser extension, in accordance with embodiments of the present invention. The computing platform 400 may comprise one or more computing devices (e.g., server(s) or the like) and is configured to execute software programs, including instructions, algorithms, modules, routines, applications, tools and the like. In addition, while FIGS. 2 and 3 illustrate separate computing platforms 300 and 400, it should be noted that functionality provided by first instructions 330 or second instructions 430 may be provided in one single instructions and, thus, one single computing platform or the functionality may be distributed amongst first and second instructions 330 and 430 in manners other than described herein without deviating from the invention as described.

Computing platform 400 includes memory 410 and the like which may comprise volatile and non-volatile memory, such as read-only and/or random-access memory (RAM and ROM), EPROM, EEPROM, flash cards, or any memory common to computing platforms). Moreover, memory 410 and the like may comprise cloud storage, such as provided by a cloud storage service and/or a cloud connection service.

Further, computing platform 400 also includes at least one processing device 420, which may be an application-specific integrated circuit ("ASIC"), or other chipset, logic circuit, or other data processing device configured to execute second instructions 430. Processing device(s) 420 or the like may execute one or more application programming interface (APIs) (not shown in FIG. 3) that interface with any resident programs, such as second instructions 430 or the like stored in the memory 410 of the computing platform 400 and any external programs. Processing device(s) 420 may include various processing subsystems (not shown in FIG. 3) embodied in hardware, firmware, software, and combinations thereof, that enable the functionality of computing platform 400 and the operability of computing platform 400 on a distributed communications network (not shown in FIG. 3). For example, processing subsystems allow for initiating and maintaining communications and exchanging data with other networked devices, such as computing platform 300 (shown in FIG. 2). For the disclosed aspects, processing subsystems of computing platform 400 may include any processing subsystem used in conjunction with second instructions 430 and related engines, tools, routines, sub-routines, algorithms, sub-algorithms, sub-modules thereof.

Computing platform 400 may additionally include a communications module (not shown in FIG. 3) embodied in hardware, firmware, software, and combinations thereof, that enables electronic communications between computing platform 400 and other network devices, such as, but not limited to, computing platform 300 (shown in FIG. 2). Thus, communication module may include the requisite hardware, firmware, software and/or combinations thereof for establishing and maintaining a network communication connection with one or more network devices.

Memory 410 stores second instructions 430, which, in specific embodiments of the invention may comprise a Static Application Security Testing (SAST) engine/tool or the like. The second instructions are configured to be applied to the encapsulated web browser extension 100 (including the wrapper function 200) to extract data 130 from the web browser extension based on the defined entry point(s) 110 and exit point(s) 120 in the wrapper function 200. In specific embodiments of the invention, in which the second instructions 430 are a SAST engine/tool, the second instructions 430 are configured to scan the encapsulated web browser extension 100 to identify security defects and/or potential security defects in the source code of the web browser extension. The SAST engine/tool is able to scan the web browser extension 100 based on the defined/emulated entry points 110 and exit point 120 in the wrapper function 200. Thus, the encapsulated web browser extension provides the web browser extension with capabilities that the web browser extension would otherwise not possess (i.e., the capability to have data extracted from the web browser extension, such as, scanning the web browser extension to identify security defects/potential security defects in the source code).

Referring to FIG. 4, a flow diagram is presented of a known/current methodology 500 for security analysis of web browser extensions, in accordance with the prior art. As described the methodology depicted in FIG. 4 is mostly manual and, as such, is labor intensive, inefficient in terms cost and susceptible to inconsistencies. At Event 510 the threat model is applied to the web browser extension (WBE) to identify the potential security threats posed by the web browser extension. At Event 520, the metadata associated with the WBE undergoes a manual review and at Event 530, the source code of the WBE undergoes an extensive manual review to identify actual security threats.

At Decision 540, a determination is made as whether any security defects are evident in the WBE. If no defects are evident in the WBE, at Event 560, the WBE is approved for deployment. If security defects are evident in the WBE, at Event 550, the outcomes of the metadata review (Event 520) and code review (Event 530) are communicated to a manual security management process, where actions are taken to correct the security defect(s) (e.g., source code is revised or the like). Once the management process is completed, the WBE is subjected to the same flow as the initial review (i.e., threat modelling (event 510) metadata review (Event 520) and code review (Event 530). Security defect management processing (Event 550) and subsequent iterative review continue until all the security defects have been resolved and, at Event 560, the WBE is approved for deployment, or, if security defects remain unresolved, at Event 570, the WBE undergoes a deprecation process (i.e., disapproved for deployment).

Referring to FIG. 5 a flow diagram is presented of a methodology 600 for security analysis of web browser extensions, in accordance with embodiments of the present invention. The flow is similar to the method described in FIG. 4, except the manual code review process has been replaced by an automated encapsulation/wrapping process (Event 630) and an automated Static Application Security Testing (SAST) process (Event 640).

Specifically, at Event 610 the threat model is applied to the web browser extension (WBE) to identify the potential security threats posed by the web browser extension. At Event 620, the metadata associated with the WBE undergoes a manual review. At Event 630, the WEB undergoes an encapsulation/wrapping process, whereby the WBE is analyzed to identify entry point(s) and exit point(s) and a wrapper function is programmatically generated that defines/emulates the identified entry and exit points. Once generated, the WBE is encapsulated with the wrapper function. At Event 640, a SAST application, e.g., a commercial off-the-shelf SAST product or the like, scan the WBE to identify actual security defects or potential security defects in the WBE's source code.

At Decision 650, a determination is made as whether any security defects are evident as a result of the SAST (event 640) or the metadata review (event 620). If no defects are evident in the WBE, at Event 680, the WBE is approved for deployment. If security defects are evident in the WBE, at Event 660, the outcomes of the metadata review (Event 520) and the SAST (Event 640) are communicated to a manual security management process, where actions are taken to correct the security defect(s) (e.g., source code is revised or the like). Once the management process is completed, the WBE is subjected to the same flow as the initial review (i.e., threat modelling (event 610), metadata review (Event 620) and SAST (Event 640). Security defect management processing (Event 660) and subsequent iterative review continue until all the security defects have been resolved and, at Event 680, the WBE is approved for deployment, or, if security defects remain unresolved, at Event 680, the WBE undergoes a deprecation process (i.e., disapproved for deployment).

Referring to FIG. 6, a flow diagram is depicted of a method 700 for enhancing the analysis capabilities of a web browser extension, specifically security application analysis, in accordance with embodiments of the present invention.

At Event 710, a web browser extension is programmatically analyzed to identify entry points and exits points. In specific embodiments of the invention the entry points are identified by commands in the web browser extension that indicate the start of control or where data enters the web browser extension. In other specific embodiments of the invention the exit points are identified by commands in the web browser extension that indicate the stop of control or where data exits the web browser extension. Moreover, exit points are defined by Application Programming Interfaces (APIs) documented/references in the web browser extension.

At Event 720, a wrapper function is programmatically generated for the web browser extension. The wrapper function defines/emulates the one or more identified entry points and exits points in the web browser extension. At Event 730, the web browser extension is encapsulated with the wrapper function, thereby enhancing the analysis capabilities of the web browser extension in terms of extracting data therefrom, e.g., scanning the web browser extension with SAST engines or the like to identify security defects or the like.

Thus, as optional Event 740, a software application, is applied to the encapsulated web browser extension to retrieve or analyze data therefrom based on the entry points and exits points defined in the wrapper function. In specific embodiments of the invention, in which the software application is a SAST engine/tool or the like, the web browser extension is scanned by the SAST tool to identify security defects or potential security defects in the source code of the web browser extension.

As evident from the preceding description, the systems, methods and the like described herein represents an improvement in technology, specifically, embodiments of the present invention provide enhancing the analysis capabilities of web browser extensions through implementation of a wrapper function that defines entry and exit points within the web browser extension. As a result, the encapsulated web browser extension enables the use of SAST tools/engines and other application that desires to analyze or extract data from the extension through the defined entry and exit points. Specifically, the invention an automated means for analyzing the web browser extension to identify the entry and exit points, generating the wrapper function that defines the identified entry and exit points and encapsulating the web browser extension with the generated wrapper function.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for enhancing analysis capabilities of a web browser extension, the system comprising:
    a web browser extension configured to provide one or more features to a web browser application; and
    a first computing platform including a first memory, one or first processing devices in communication with the first memory and first instructions stored in the first memory and executable by the at least one of the first processing devices, wherein the first instructions are configured to:
        analyze the web browser extension to identify one or more entry points and one or more exits points in the web browser extension,
        generate a wrapper function for the web browser extension that defines the one or more identified entry points and the one or more identified exits points, and
        encapsulate the web browser extension with the wrapper function; and
    a second computing platform including a second memory, one or more second processing devices in communication with the second memory, and second instructions stored in the second memory and executable by at least one of the second processing devices, wherein the second instructions are configured to be applied to the encapsulated web browser to:
        retrieve or analyze data from the encapsulated web browser extension based on the one or more entry points and the one or more the exits points defined by the wrapper function, and
        identify from the retrieved and analyzed data at least one of (i) one or more security defects and (ii) one or more potential security defects in the web browser extension.

2. The system of claim 1, wherein the second instructions are further defined as a Static Application Security Testing (SAST) engine that is configured to:
    scan the encapsulated web browser extension, based on the one or more entry points and the one or more the exits points defined by the wrapper function, to identify the at least one of one or more security defects and one or more potential security defects in the web browser extension.

3. The system of claim 1, wherein the first instructions are further configured to analyze the web browser extension to identify the one or more entry points and the one or more exit points, wherein the one or more entry points are defined by first instances in which control of a function starts in the web browser extension and the one or more exit points are defined by second instances in which the control of the function stops in the web browser extension.

4. The system of claim 1, wherein the first instructions are further configured to analyze the web browser extension to identify one or more entry points and the one or more exit points, wherein the one or more entry points are defined by first instances in which data is received by the web browser extension and the one or more exits points are defined by second instances in which data exits the web browser extension.

5. The system of claim 1, wherein the first instructions are further configured to analyze the web browser extension to identify the one or more exits points by identifying one or more Application Programming Interfaces (APIs) documented with the web browser extension.

6. A computer-implemented method for enhancing analysis capabilities of a web browser extension, one or more steps of the method executed by one or more processing devices and comprising:
    analyzing a web browser extension to identify one or more entry points and one or more exits points in the web browser extension;
    generating a wrapper function for the web browser extension that defines the one or more identified entry points and the one or more identified exits points;
    encapsulating the web browser extension with the wrapper function;
    retrieving, by a software application, data from the encapsulated web browser extension based on the one or more entry points and the one or more the exits points defined by the wrapper function; and
    identify, from the retrieved data, at least one of (i) one or more security defects and (ii) one or more potential security defects in the web browser extension.

7. The computer-implemented method of claim 6, wherein the software application is a Static Application Security Testing (SAST) engine.

8. The computer-implemented method of claim 7, further comprising:
    scanning, by the SAST engine, the encapsulated web browser extension, based on the one or more entry points and the one or more the exits points defined by the wrapper function, to identify, from the retrieved data, the at least one of one or more security defects and one or more potential security defects in the web browser extension.

9. The computer-implemented method of claim 6, wherein analyzing further comprises analyzing the web browser extension to identify first instances in which control of a function starts in the web browser extension and second instances in which the control of the function stops in the web browser extension.

10. The computer-implemented method of claim 6, wherein analyzing further comprises analyzing the web browser extension to identify first instances in which data is received by the web browser extension and second instances in which data exits the web browser extension.

11. The computer-implemented method of claim 6, wherein analyzing further comprises analyzing the web browser extension to identify one or more Application Programming Interfaces (APIs) documented with the web browser extension as the one or more exit points.

12. A computer program product including non-transitory computer-readable medium that comprises:
   a first set of codes for causing a computer to analyze a web browser extension to identify one or more entry points and one or more exits points in the web browser extension;
   a second set of codes for causing a computer to generate a wrapper function for the web browser extension that defines the one or more identified entry points and the one or more identified exits points; and
   a third set of codes for causing a computer to encapsulate the web browser extension with the wrapper function;
   a fourth set of codes for causing a computer to retrieve or analyze, by a software application, data from the encapsulated web browser extension based on the one or more entry points and the one or more the exits points defined by the wrapper function; and
   a fifth set of codes for causing a computer to identify, from the retrieved or analyzed data at least one of (i) one or more security defects and (ii) one or more potential security defects in the web browser extension.

13. The computer program product of claim 12, wherein the software application is a Static Application Security Testing engine.

14. The computer program product of claim 13, wherein the fourth set of codes are further configured to cause the computer to scan the encapsulated web browser extension, based on the one or more entry points and the one or more the exits points defined by the wrapper function.

15. The computer program product of claim 12, wherein the first set of codes are further configured to cause the computer to analyze the web browser extension to identify first instances in which control of a function starts in the web browser extension and second instances in which the control of the function stops in the web browser extension.

16. The computer program product of claim 12, wherein the first set of codes are further configured to cause the computer to analyze the web browser extension to identify first instances in which data is received by the web browser extension and second instances in which data exits the web browser extension.

* * * * *